Figure 1:
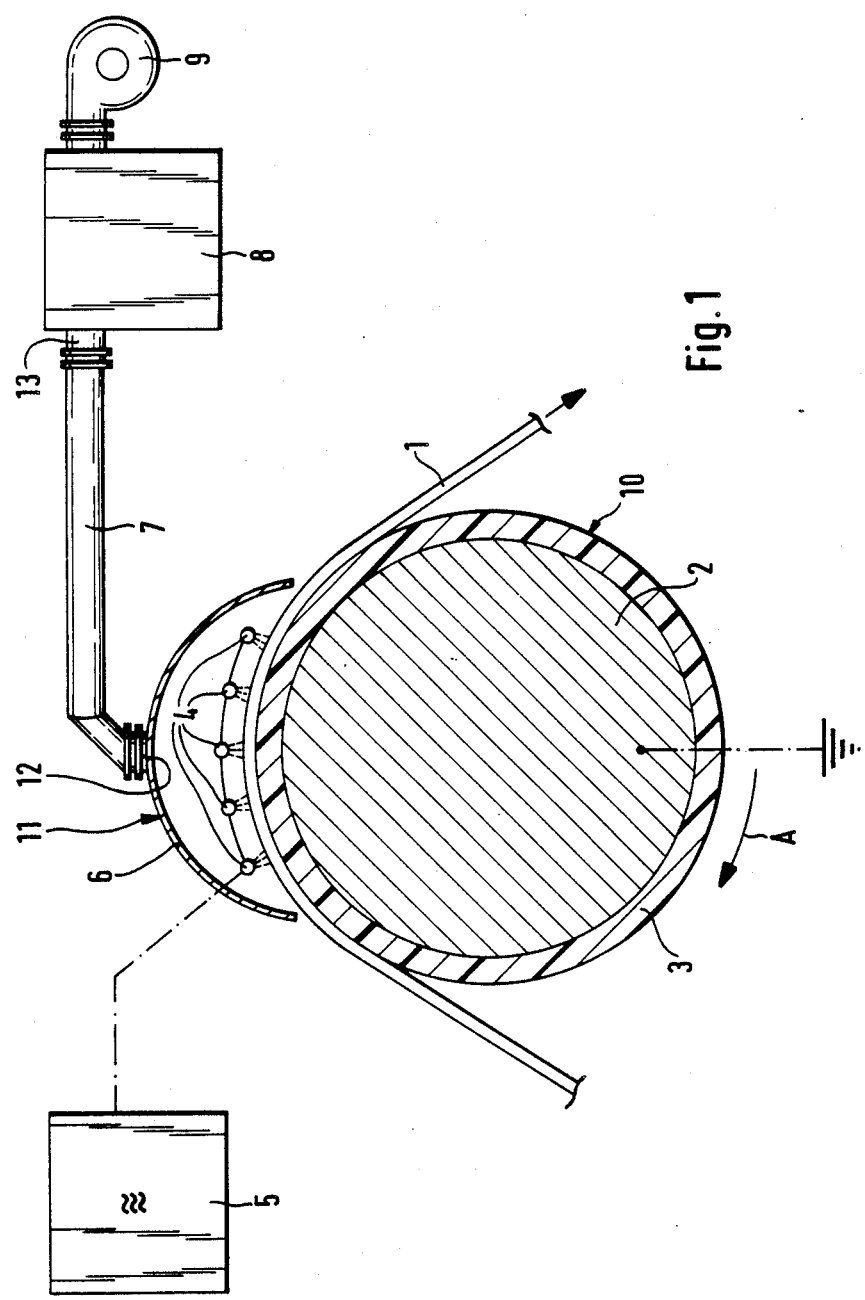

United States Patent [19]

Dinter et al.

[11] Patent Number: 4,929,319
[45] Date of Patent: May 29, 1990

[54] PROCESS AND DEVICE FOR SURFACE PRE-TREATMENT OF PLASTIC BY MEANS OF AN ELECTRICAL CORONA DISCHARGE

[75] Inventors: Peter Dinter, Hallgarten; Lothar Bothe, Mainz-Gonsenheim; John D. Gribbin, Schlangenbad, all of Fed. Rep. of Germany

[73] Assignee: Hoechst Aktiengesellschaft, Frankfurt am Main, Fed. Rep. of Germany

[21] Appl. No.: 156,572

[22] Filed: Feb. 17, 1988

[30] Foreign Application Priority Data

Feb. 20, 1987 [DE] Fed. Rep. of Germany ....... 3705482

[51] Int. Cl.$^5$ .............................................. C07C 3/24
[52] U.S. Cl. ..................................... 204/164; 204/165; 204/168; 204/169; 204/170; 427/39; 427/40; 264/22
[58] Field of Search ............... 204/164, 165, 169, 170, 204/168; 264/22; 427/39, 40

[56] References Cited

U.S. PATENT DOCUMENTS

| | | | |
|---|---|---|---|
| 3,142,630 | 7/1964 | Antokal et al. | 204/162 |
| 3,274,089 | 9/1966 | Wolinski | 204/165 |
| 3,660,549 | 5/1972 | Hawkins | 264/22 |
| 3,686,374 | 8/1972 | Hawkins | 264/22 |
| 4,148,851 | 4/1979 | Tani et al. | 264/23 |
| 4,571,316 | 2/1986 | Naruse et al. | 264/22 |
| 4,615,906 | 10/1986 | Kolbe et al. | 427/40 |

FOREIGN PATENT DOCUMENTS

| | | |
|---|---|---|
| 0160889 | 11/1985 | European Pat. Off. . |
| 1284620 | 12/1968 | Fed. Rep. of Germany . |
| 2022913 | 11/1970 | Fed. Rep. of Germany . |
| 3247795A1 | 6/1984 | Fed. Rep. of Germany . |
| 4817747 | 12/1985 | Japan . |
| 938325 | 10/1963 | United Kingdom . |
| 1095837 | 12/1967 | United Kingdom . |
| 1215234 | 12/1970 | United Kingdom . |
| 1526918 | 10/1978 | United Kingdom . |

*Primary Examiner*—John F. Niebling
*Assistant Examiner*—Steven P. Marquis
*Attorney, Agent, or Firm*—Foley & Lardner, Schwartz, Jeffery, Schwaab, Mack, Blumenthal & Evans

[57] ABSTRACT

For surface pre-treatment of a plastic article, such as a film sheet or the interior of a plastic molded article, by means of electrical corona-discharge, a device is provided having a generator 5 and a corona discharge device 11. The generator applied a high-frequency, high-voltage alternating current to the discharge electrodes 4 of the corona-discharge device 11. The grounded counterelectrode used is the metal core 2 of a roller 10 over whose peripheral coating 3 a film sheet 1 is transported. A housing 6 encompasses the electrodes 4 of the corona-discharge device 11 and is connected via a line 7 to an atomizer 8 in which a liquid is atomized to form an aerosol by means of a piezoelectrically operating ultrasonic vibration system or by two-component atomizer nozzles which operate at ultrasonic speed. A fan 9, the throughput rate of which can be regulated, is connected to the atomizer 8 and pushes the carrier gas, for example, air, for the aerosol through the atomizer into the corona-discharge device 11. Further corona-discharge devices can be present into which an aerosol of another liquid or only a reactive gas are fed.

11 Claims, 5 Drawing Sheets

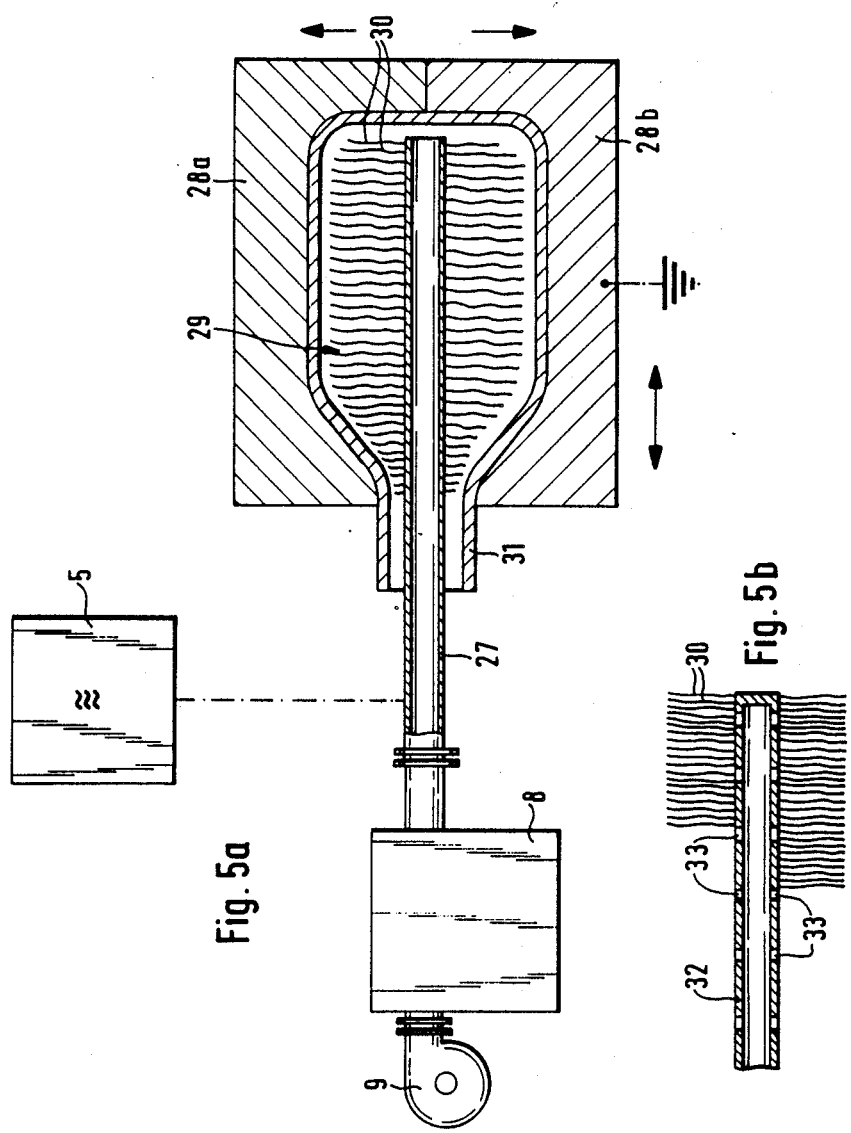

PROCESS AND DEVICE FOR SURFACE PRE-TREATMENT OF PLASTIC BY MEANS OF AN ELECTRICAL CORONA DISCHARGE

BACKGROUND OF THE INVENTION

The present invention relates to a process for surface pre-treatment of plastic by means of an electrical corona discharge which takes place between voltage-conducting electrodes and a grounded counter-electrode, between which the plastic is located. The invention also relates to a device for carrying out this process.

In many cases, the usually smooth surface of plastics, in particular of films, presents difficulties inasmuch as the film sheets have extremely good slip and this causes them to easily tend to telescope during winding up on a reel. Further difficulties due to the smooth surfaces of films or plastics arise during processing of these materials in order to increase the adhesion of printing inks, paints, adhesives, vapor-deposited metals and the like. In order to overcome these difficulties, the prior art includes carrying out chemical-physical modification of the surface of plastics, in particular of films. A basic process, which only causes changes on the plastic surface, comprises pretreating a plastic surface by means of an electrical corona discharge.

Thus, in accordance with German Offenlegungsschrift No. 3,247,795, corona pre-treatment of a plastic film sheet is carried out by subjecting the upper side and/or the lower side of the film sheet to the action of a corona, giving different pre-treatment intensities. For this purpose, the film sheet to be treated is passed over an electrically grounded roller, and electrical charging is carried out by subjecting the side of the film sheet facing away from the roller surface to an electrical corona discharge which is produced by applying a high-frequency, high-voltage alternating current to an electrode arranged at a distance from the roller. The pre-treatment is generally carried out under air at atmospheric pressure.

The constantly increasing market demands for products having improved surface properties have also led to the development of processes using chemically reactive substances which, for example, break certain chemical bonds in the surface and thereby modify the surface properties of plastics. In U.S. Pat. No. 3,142,630, a process is described for increasing adhesion, in which a film sheet is passed through a non-ionizing liquid and, in the liquid, is subjected to a corona discharge. This liquid can be, for example, a transformer-cooling oil, vegetable oil or another pure oil, which is free of impurities and is substantially non-electroconducting.

In British Patent No. 938,325, a process is described for the pretreatment of thermoplastic films in which an electrical corona discharge takes place on the surface in a nitrogen atmosphere. The nitrogen is passed into the corona-discharge zone via distribution lines through hollow electrode lines.

In the device which is described in U.S. Pat. No. 3,274,089, organic compounds from the group comprising polymerizable organic compounds, non-polymerizable organic compounds having substitutable hydrogen atoms, and perhalogenated hydrogen are passed into the corona-discharge zone through distribution lines in order to modify the surface of the film sheets or objects made of polymers.

Common to these known processes is that reactive gases are passed into the corona-discharge region between the electrodes, or the corona discharge is carried out in a non-conducting liquid.

Japanese Patent No. 17,747/73 discloses a device in which a film surface is subjected to a corona discharge. The electrode connected to the generator comprises porous sinter metals and several metal nets. The discharge electrode is shaped so that liquid fed to it is collected and stored. The stored liquid is converted into the gas phase by the voltage applied to the discharge electrode and leaves the porous sinter metals in the form of gas particles, which move toward the film surface under the influence of the electrical field lines of the corona discharge.

In devices and processes which include a liquid as the discharge electrode in the corona-discharge operation, the necessity arises to fall back on specific devices which make possible storage or collection of the liquid and, in addition, must comprise a material which permits passage into the corona-discharge zone of the liquid which has been converted into the gas phase. If the film sheet to be pre-treated is passed through a liquid in which corona discharge takes place, the transport speed of the film sheet through the liquid is obviously limited. If corona discharge takes place in a reactive atmosphere on the plastic surface, various layers can subsequently be applied by further process measures in order to finish the plastic surface. Simultaneous coating and pre-treatment is not possible in this type of case. The same applies to pre-treatment of plastic surfaces where corona discharge takes place on the surface in a liquid.

SUMMARY OF THE INVENTION

It is therefore an object of the present invention to provide a process for pre-treating plastic surfaces with reactive substances in liquid form. It is also an object of the invention to provide such a process in which it is possible to simultaneously also apply specific layers to the plastic surfaces in order to finish the latter.

Still another object of the invention is to provide an apparatus for carrying out the improved process according to the invention.

In accomplishing the foregoing objects, there has been provided in accordance with one aspect of the present invention a process for surface pre-treatment of plastic, comprising the steps of: producing an electrical corona discharge in a corona-discharge zone between at least one voltage-conducting electrode and a grounded counter-electrode; placing a plastic article in the corona-discharge zone; atomizing a liquid to produce an aerosol; and introducing the aerosol into the corona-discharge zone by means of a stream of a gas.

In accordance with another aspect of the present invention, there has been provided a device for surface pre-treatment of a plastic article, comprising: a first electrostatic corona-discharge device having at least one electrode; a high-frequency, high-voltage alternating current generator connected to the at least one electrode; a grounded counterelectrode located at a distance from the at least one electrode; a first housing for shielding the at least one electrode of the first corona-discharge device from the environment; an atomizer for atomizing liquid to form an aerosol which is capable of remaining suspended; a line connecting the atomizer with the first housing; and a fan, having means for regulating its throughput rate, connected to the atomizer for transporting a carrier gas for the aerosol through the atomizer into the first corona-discharge device.

In accordance with another aspect of the invention, there has been provided a device for surface pre-treatment of a hollow molded plastic article, comprising: an electrical corona-discharge device having a plurality of electrodes; a high-frequency, high-voltage alternating current generator connected to the electrodes; a grounded counter-electrode located at a distance from the electrodes; a metallic support pipe which incorporates on its outside surface the electrodes in the shape of a brush head; an atomizer for atomizing a liquid to form an aerosol; an adjustable fan for pushing a carrier gas for the aerosol into the atomizer; and means for inserting the corona-discharge device into the interior of a hollow molded plastic article, the support pipe being connected to the generator and to the atomizer.

Further objects, features and advantages of the present invention will become apparent from the detailed description of preferred embodiments that follows, when considered in view of accompanying figures of drawings.

BRIEF DESCRIPTION OF THE DRAWINGS

In the drawings:

FIG. 1 shows a schematic view of a device for surface pre-treatment of plastic by means of an electrical corona discharge;

FIG. 2 shows a schematic view of a device for surface pre-treatment of plastics which comprises two corona-discharge devices;

FIG. 3 shows a schematic view of a further device for surface pre-treatment of plastics which has two corona-discharge devices;

FIG. 4 shows another embodiment of the device according to the invention, having a single corona-discharge device for surface pre-treatment of a plastic melt;

FIG. 5*a* shows a further embodiment of the device having a corona-discharge device for surface pretreatment of the interior of plastic molded articles; and FIG. 5*b* shows a modified embodiment of a component of the corona-discharge device according to FIG. 5*a*.

DETAILED DESCRIPTION OF THE PREFERRED EMBODIMENTS

According to the invention, the process includes the steps of forming an aerosol by atomizing a liquid, and introducing the aerosol into the corona-discharge zone by means of a stream of air or gas.

A device is provided according to the invention, for surface pretreatment of plastic by means of an electrical corona discharge, having electrodes to which a high-frequency, high-voltage alternating current is applied by a generator and which are arranged at a distance from a grounded counterelectrode. The electrodes of a first corona-discharge device are shielded from the environment by a housing which is connected via a line to an atomizer for atomizing liquid to form an aerosol which is capable of remaining suspended, and a fan, the throughput rate of which can be regulated, is connected to the atomizer and pushes the carrier gas for the aerosol through the atomizer into the corona discharge device.

In one embodiment of the device, the atomizer comprises an ultrasound vibration system which operates piezoelectrically, or the atomizer incorporates two-component atomizer nozzles operating at ultrasound speed.

The corona discharge initiates reaction mechanisms which cause chemical surface modification of the treated plastic. Depending on the nature of the aerosol liquid employed and the carrier gas for the aerosol, active centers in the form of functional groups and radicals which are reactants for subsequent processes for the substances applied are produced on the treated plastic surface. Depending on the nature of the aerosols and carrier gases used, it is also possible to apply polymerizable or crosslinking layers to the plastic surface in a single process step.

Details of the process according to the invention and illustrative embodiments of the device according to the invention are described in greater detail below with reference to drawings.

FIG. 1 shows a device comprising a roller 10 over which is passed a film sheet 1 to be treated, and a first corona-discharge device 11, which comprises a housing 6 and electrodes 4, which are connected to a generator 5. The roller comprises a metallic roller core 2 and a dielectric coating 3 applied to the latter. The roller core 2 is grounded so that the roller 10 forms the counter-electrode to the electrodes 4 of the corona-discharge device 11. The distance between the electrodes 4 and the film sheet 1 is up to about 2 mm. The roller 10 rotates in the direction of the arrow A. The generator 5 applies a high-frequency, high-voltage alternating current to the electrodes 4. Between the grounded roller 10 and the electrodes 4, an electrical corona discharge is thereby triggered, through the field lines of which, indicated schematically in FIG. 1, the film sheet 1 is passed. The electrodes 4 are screened against the environment by the housing 6, which is connected to an atomizer 8 via a line 7, for example, a rigid pipe or a tube or another flexible line. The line 7 is connected to a pipe connector 12 of the housing 6 at one end and to a pipe connector 13 of the atomizer 8 at the other end. Atomization of the liquid to be introduced in each case takes place in the atomizer 8 to form an aerosol which is capable of floating or being suspended and which is transported into the corona-discharge device 11 by means of a stream of air or carrier gas which is supplied by a fan 9, the throughput rate of which can be regulated. The atomizer 8 comprises two-component atomizer nozzles which are known per se and in which the liquid is broken up into tiny droplets by the carrier gas, for example air, which emerges at the speed of sound. Alternatively, atomizer 8 comprises piezoelectric ultrasound vibration systems which, due to their vibrations, cause the carrier gas or the air to vibrate correspondingly, in order to be able to break up the liquid into tiny droplets. The fan 9 is mounted directly on the atomizer 8. The aerosol introduced or blown into the housing 6 of the corona-discharge device 11 is distributed homogeneously in the interior of the housing 6 and moves along the field lines, which run from the electrodes 4 toward the film sheet 1, onto the film surface, where they are precipitated. Very even wetting or coating of the film sheet 1 by the aerosol thereby arises, whereby very homogeneous modification of the surface properties of the film sheet takes place.

As discharge electrodes, the electrodes 4 have an open construction, i.e., an electrode shape having an adequately large free cross-section between the individual electrodes. For this purpose, wire electrodes arranged axially parallel to the periphery of the roller 10 have proven highly suitable. In addition to the surface activation of the film sheet, specific coatings can be applied to the film sheet. For this purpose, extremely thin coatings are in many cases sufficient to modify the surface properties, such as, for example, the antistatic behavior, non-stick properties, abrasion resistance, static friction and sliding friction behavior, barrier behavior, adhesion and adhesion promotion, of a film in the desired fashion. Besides monomers, it is possible to use dispersions and solutions of low- and/or high-molecular-weight components and colloidal systems which are available, inter alia, for the production of the aerosols. These can be employed in aqueous form or dissolved in solvents.

An alternating voltage between about 5,000 V and 25,000 V is applied to the electrodes 4 of the corona-discharge device 11 by the generator 5, the alternating voltage present between the electrodes 4 and the roller 10 or the roller core 2 thereof as the grounded counter-electrode being selected to be proportional to the transport rate of the film sheet 1 through the corona-discharge device 11. Investigations have shown that, as the transport rate increases, the alternating voltage applied, which is supplied by the generator 5, must also be increased in order to achieve homogeneous surface modification of the film sheet 1. If, for example, an antistatic agent is sprayed onto the film sheet 1, it becomes apparent, for example, that, at a generator voltage of 5,000 V and a transport rate which is increased from 20 m/min to 40 m/min and finally to 60 m/min, the initial average surface resistance of $8.5 \times 10^7$ increases through $4 \times 10^8$ to about $7 \times 10^9$ ohm·m. The uncoated film surface generally has an average surface resistance of about $1 \times 10^{13}$ ohm·m. If the generator voltage is 15,000 V, the average surface resistance changes from $5 \times 10^7$ through $1 \times 10^8$ to about $3 \times 10^8$ ohm·m while the transport speed increases from 20 m/min through 40 m/min to 60 m/min. From these changes, it can be seen that an increase in the transport rate of the film sheet 1 must go hand in hand with an increase in the generator voltage applied in order to keep the average surface resistance of the antistatic-coated film sheet 1 approximately constant. This relationship between the transport rate and the generator voltage applied is obviously caused by the fact that it is necessary to at the same time spray more antistatic agent onto the film sheet at a higher transport rate of the film sheet 1 in order to obtain a homogeneous coating on the surface of the film sheet. The increase in the amount of antistatic agent supplied is achieved by increasing the generator voltage applied (see Table 2).

Figure 2:
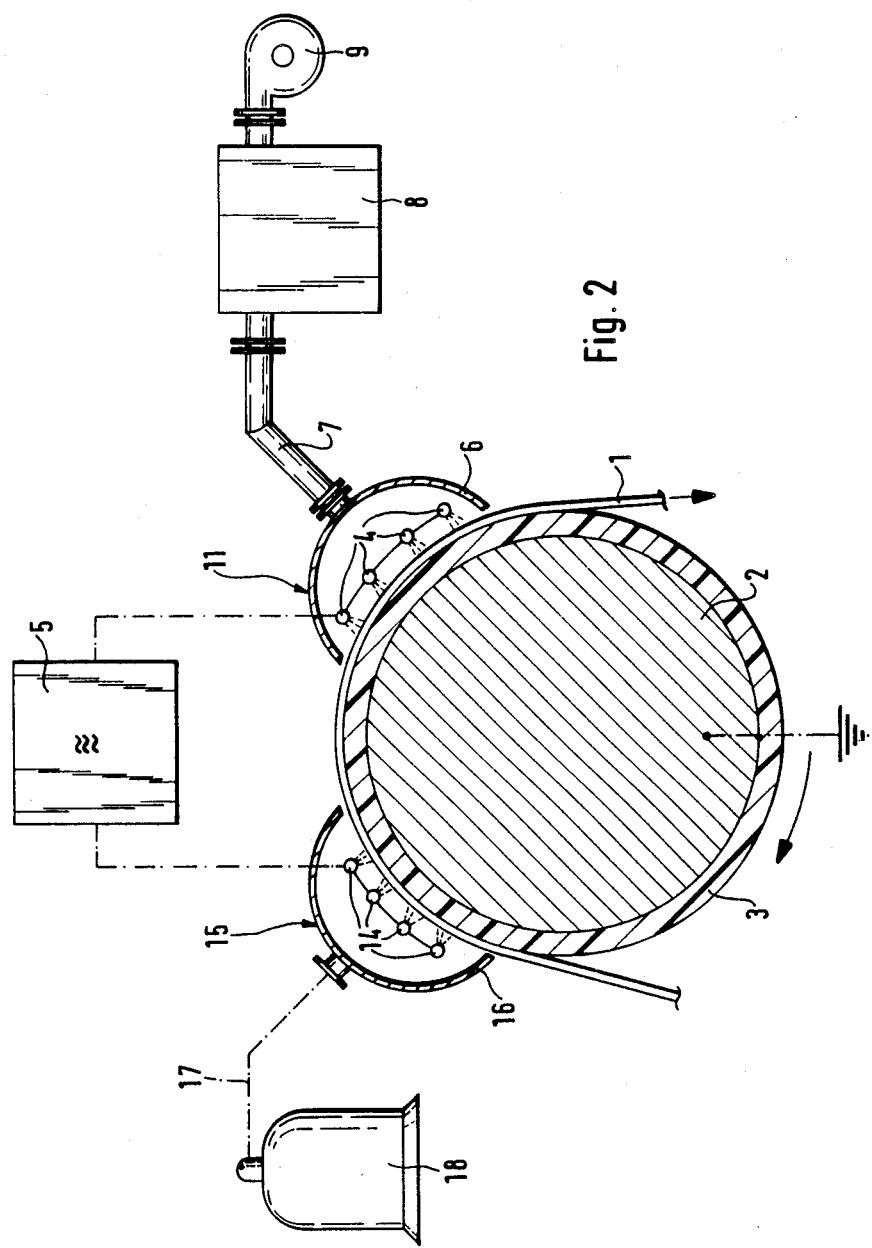

FIG. 2 shows an embodiment of the invention which is constructed in similar fashion to FIG. 1 and in which a second corona-discharge device 15 is arranged upstream, in the transport direction of the film sheet 1, of the first corona-discharge device 11. The electrodes 14 of the second corona-discharge device are screened by a housing 16, which is connected to a gas container 18 via a line 17. The generator 5 supplies not only the electrodes 4 of the first corona-discharge device 11 but also the electrodes 14 of the second corona-discharge device 15. The remaining components of this device, such as the atomizer 8 and the fan 9, are the same as the corresponding components of the device of FIG. 1 and will therefore not be described again.

In the device of FIG. 2, combined pre-treatment takes place of the film sheet 1, which is initially subjected to corona discharge in a reactive atmosphere in the region of the second corona-discharge device 15, i.e., surface modification of the film sheet 1, before treatment involving application of an aerosol to the film surface by means of corona discharge in the first corona-discharge device 11. By feeding a gas from the gas container 18 into the second corona-discharge device 15, a balanced modification or activation of the film sheet to be treated can be carried out in the corona-discharge zone of the first corona-discharge device 11. The reactivating gas used can be, for example, nitrogen or other nitrogen containing gaseous compounds.

The gas container 18 is connected to the housing 16 of the second corona-discharge device 15 via a line 17. The pressure of the gas flowing out of the gas container 18 is usually regulated by a pressure-reducing valve, which is not represented in greater detail. FIG. 2 shows that a voltage is applied to the discharge electrodes 4 and 14 of the two corona-discharge devices 11 and 15 together by the single generator 5, but an arrangement is also possible in which high-voltage is applied to the electrodes of each corona-discharge device by its own generator.

Figure 3:
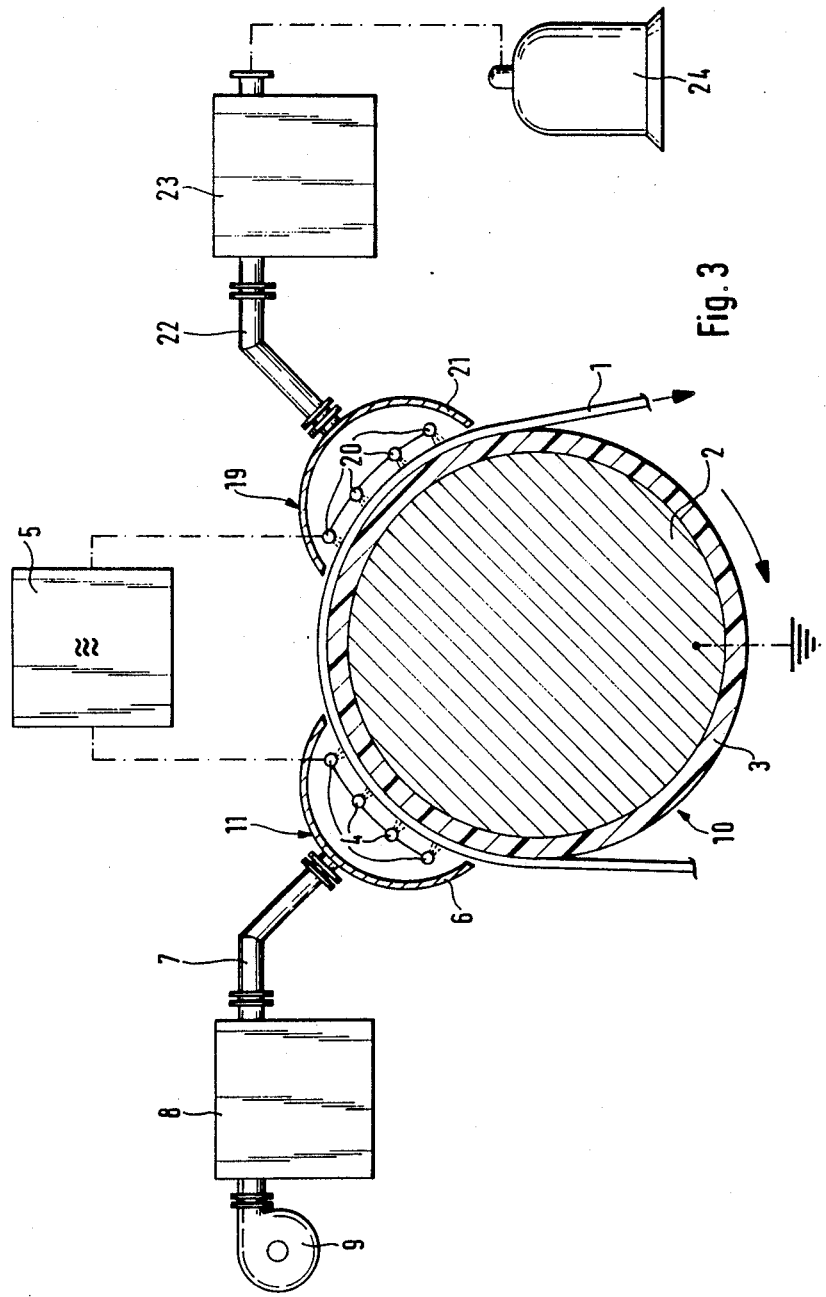

FIG. 3 shows an embodiment of the invention in which two devices corresponding to the device represented in FIG. 1 are arranged along the periphery of the roller 10. The first corona-discharge device 11 comprising the connected atomizer 8 and the fan 9 corresponds substantially to the device as has been described with reference to FIG. 1. Downstream of the first corona-discharge device 11 in the transport direction of the film sheet 1, a third corona-discharge device 19 having electrodes 20 is provided, the housing 21 of which surrounds the electrodes 20. The housing 20 is connected via a pipe connector and a line 22 to a pipe connector of an atomizer 23, to which a gas container 24 is connected. In the gas container 24, a carrier gas is stored for the aerosol which is produced in the atomizer 23 from the treatment liquid. Suitable carrier gases are, besides air and nitrogen, various noble gases.

The electrodes 4 and 20 of the first and third corona-discharge devices 11 and 19, respectively, are connected to the common generator 5. However, it is also possible in this device that each of the corona-discharge devices is supplied with voltage via a separate generator.

By means of the fan 9, either air or another gas can be blown into the atomizer 8, and this is then used as the carrier gas for the particular aerosol which is fed into the corona-discharge device 11. By means of the device shown, two different liquids or aerosols produced therefrom can be used, and in addition, different carrier gases for each particular aerosol can also be used. Through the combination of liquid and gaseous reactants, this device permits a wide variety of surface modifications of the film sheet 1. Depending on the nature of the substances used, it is also possible to apply polymerizable or crosslinking layers to the film sheet surface by means of the aerosols. The film sheet 1 can comprise polypropylene, polyester and also polyvinyl chloride. Possible transport rates for the film sheet 1 are in the range from about 20 to 200 m/min.

Figure 4:
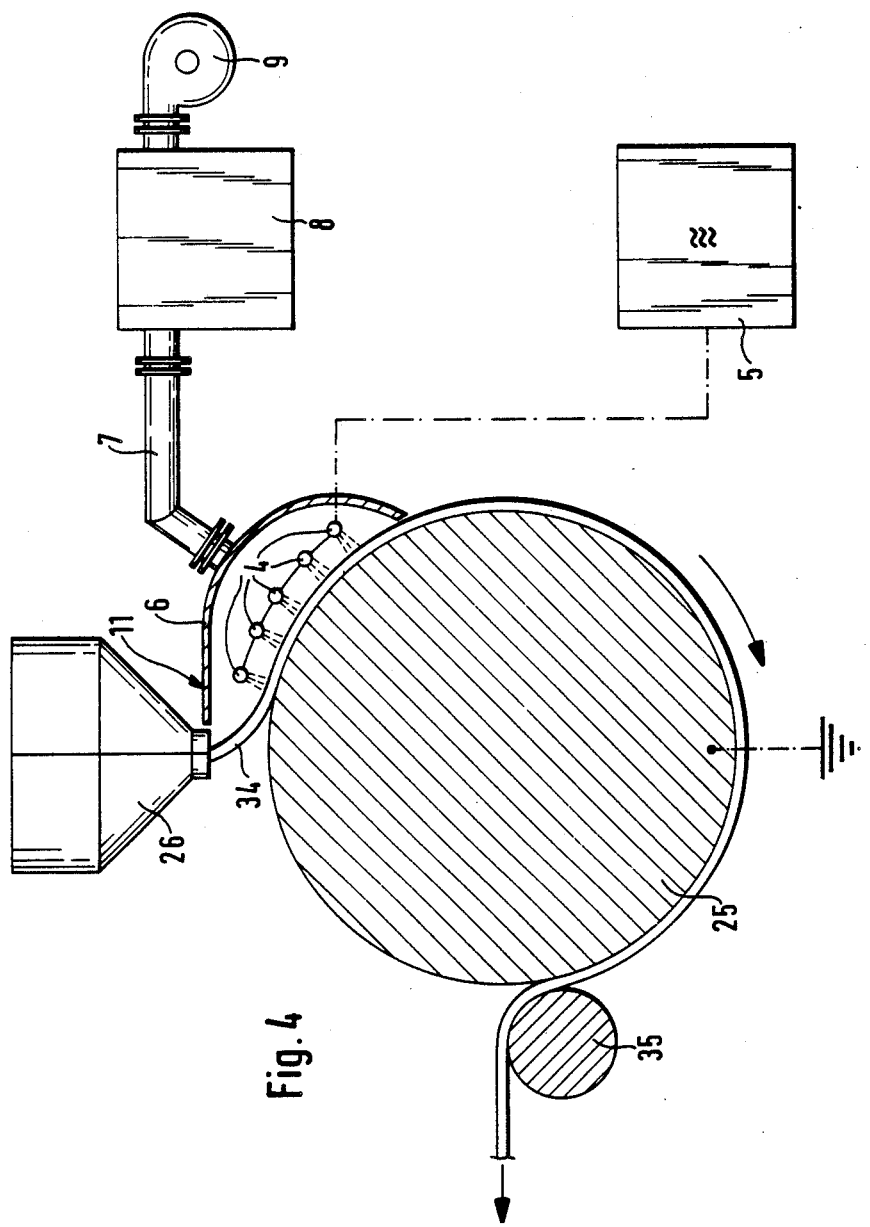

Using the device represented in FIG. 4, modification of extruded plastic melts is possible. A plastic melt film 34 is extruded onto the peripheral surface of a chill roller 25 from a flat film die 26, which is arranged in the vicinity of the periphery of the chill roller 25. The housing 6 of the first corona-discharge device 11 is arranged so that it is immediately adjacent to the flat film die 26. In addition, the housing 6 screens the electrodes 4 of the corona-discharge device 11. The housing 6 is connected via the line 7 to the atomizer 8, to which the fan 9 is connected. The generator 5 applies the high-frequency, high-voltage alternating current necessary to the electrodes 4. The counter-electrode to the electrodes 4 is the grounded chill roller 25. The melt film 34 is taken off the chill roller 25 via a deflecting roller 35.

The use of liquids was hitherto not possible during surface modification of melt films since the large liquid drops produced by conventional spray systems caused intolerable deformation and thus quality-reducing damage to the ductile melt film. The aerosols produced by the atomizer 8, which are capable of floating and have droplet sizes in the region smaller than about 3 μm exclude this danger from the outset. In addition to the surface modification of the melt film, the morphology of the extruded melt film can also be influenced using the device represented in FIG. 4. The additional application of an aerosol to the air side of the melt film 34 favors cooling of the melt film and, in addition, controls the crystallinity, the surface roughness, the turbidity and similar parameters of the melt film. Compared to the embodiments represented in FIGS. 1 to 3, the embodiment of FIG. 4 differs only through the devices required for extrusion of the melt film 34, namely, the metallic chill roller 25, the temperature of which can be controlled, and through the flat film die 26 for shaping the melt film.

FIG. 5a shows an embodiment of the invention which is suitable for treating the interior of plastic molded articles. An area of application for surface treatment of canisters, containers, tanks and other storage vessels for chemicals is the finishing of internal plastic surfaces of these containers in order to reduce the permeability of these plastic containers with respect to various liquids. A particular disadvantage is the excessively high permeability towards hydrocarbons when polyethylene is used for such containers. By suitable treatment methods, the permeability, for example, for some aliphatic and aromatic hydrocarbons, for example, gasoline, can be reduced to less than 2%. To accomplish this, it is known to use elemental fluorine, in particular dissolved in solvents or solvent mixtures, which reacts with polyethylene on the surface to form a thin fluorinated layer which contains fluorocarbon and fluorohydrocarbon groups. This process is also known as solution fluorination, in which it is additionally possible to add carrier gases, such as, for example, oxygen, sulfur dioxide and carbon dioxide. Through fluorination, the permeability for various solvents is reduced, and the plastic surface is also modified so that it can be painted and bonded.

A corona-discharge device 29 comprises a metallic support pipe 27, which incorporates on its exterior electrodes 30 in the shape of a brush head. The counterelectrode to the electrodes 30 is formed by a mold part 28b, which, together with a further mold part 28a of metal, encompasses the plastic molded article 31 to be treated. The hollow support pipe 27 is connected to a pipe connector of the atomizer 8, which is connected to the fan 9. The generator 5 applies the high-frequency alternating current necessary for the corona discharge to the support pipe 27 and thus to the electrodes. As the counterelectrode to the electrodes 30, the mold part 28b is grounded. In the atomizer 8, elemental fluorine, for example, dissolved in a solvent, is atomized to form an aerosol, the fan 9 blowing the carrier gas, for example, air, for the aerosol into the atomizer. The aerosol then flows from the atomizer into the hollow support pipe 27, which has an open end through which the aerosol flows into the interior of the molded article 31. The molded article surrounds the support pipe 27 in the region of the electrodes 30, the geometrical shape of which is matched to the internal contours of the molded article 31.

The molded article 31 is held in the two metal mold parts 28a and 28b, the interior of the mold parts being matched to the external contours of the molded article 31.

FIG. 5b shows a further embodiment of a support pipe 32, which can be used in place of the support pipe 27 in FIG. 5a. In its pipe wall, this support pipe 32 contains holes 33, whereas its end which is located in the molded article 31 is sealed. The aerosol flowing into the support pipe 32 from the atomizer 8 flows through these holes 33 into the interior of the molded article 31, which surrounds the support pipe 32 in the region of the electrodes 30, the geometrical dimensions of which, as mentioned above, are matched to the internal contours of the molded article 31. The electrodes 30 on the support pipes 27 and 32 comprise elastic, electroconducting materials, such as metal wires or carbon fibers.

By including liquids, specifically in the form of aerosols, in the corona-discharge processes, the process according to the invention for modification of plastic surfaces with the aid of corona discharges considerably extends the possibility of chemically modifying the surfaces of plastic materials. Depending on the nature of the liquids used for the aerosols and of the transport gases for the particular aerosols, the subsequent finishing steps, such as coating, printing, laminating, painting, metallizing and balanced surface modifications, can be regulated, or chemically active layers can be applied to the plastic surfaces treated.

A selection of substances which can be introduced as aerosols into the corona-discharge devices is collated below in tabular form. Table 1 shows, for the individual substances, their applicability and the type of surface modification of the plastic which can be achieved. This selection makes no claims with regard to completeness and does not limit the invention; rather, it is merely illustrative. In principle, it is possible to use all substances which form aerosols and which are able to modify the plastic surfaces in any desired fashion.

In a further Table 2, the sheet rates, the aerosols used and the average surface resistances measured after the pre-treatment of the film sheets are collated for certain transport rates of film sheets whose surfaces have been modified.

Comparison Examples 1 and 2 in Table 2 show that, when the corona discharge is omitted and only the antistatic agent is sprayed on, the average surface resistance of $1\times10^{13}$ ohm·m is essentially the same order as magnitude as the surface resistance of an untreated film surface and that, when the surface is treated in two steps, namely, by a pure corona discharge and subsequent spraying-on of the antistatic agent, the average surface resistance of $3\times10^{9}$ ohm·m is higher by a power of ten than in the pre-treatment according to the invention.

TABLE 1

| Substances for aerosols | Properties of the plastic surfaces after modification |
|---|---|
| Polyurethane<br>Polyvinyl alcohol<br>Copolyester<br>Acrylate | Adhesion promotion |
| Acrylate | Slip/adhesion promotion |

TABLE 1-continued

| Substances for aerosols | Properties of the plastic surfaces after modification |
|---|---|
| Polyvinylidene chloride | Barrier behavior/ adhesion promotion |
| Fluoropolymer Fluoroacrylate Perfluoropolyether Polyether siloxanes | Slip/non-stick behavior |
| Acrylate | Slip |
| Quaternary ammonium salt Choline ester chloride Alkylsulfonate Alkyl sulfate Dialkyldimethyl- ammonium chloride polymer | Antistatic |

TABLE 2

| Transport rate of the film sheet (m/min) | Corona- discharge voltage (volts) | Substance | Average surface resistance (ohm · m) |
|---|---|---|---|
| 20 | 5,000 | | $8.5 \times 10^7$ |
| 40 | 5,000 | | $4 \times 10^8$ |
| 60 | 5,000 | | $7 \times 10^9$ |
| 20 | 10,000 | Quaternary ammonium salt as antistatic (product name LEOMIN FA) | $4 \times 10^7$ up to $6 \times 10^7$ |
| 40 | 10,000 | | $1 \times 10^8$ |
| 60 | 10,000 | | $3 \times 10^8$ |
| 20 | 15,000 | | $5 \times 10^7$ |
| 40 | 15,000 | | $1 \times 10^8$ |
| 60 | 15,000 | | $3 \times 10^8$ |
| 60 | 20,000 | | $2 \times 10^8$ up to $9 \times 10^9$ |
| 20 (Comparison Example 1) | Corona dis- charge | Quaternary ammonium salt, sprayed on | $1 \times 10^{13}$ |
| 20 (Comparison Example 2) | 10,000 | 1st step | |
| | — | 2nd step Quaternary ammonium salt, sprayed on | $3 \times 10^9$ |

What is claimed is:

1. A process for corona-discharge surface pre-treatment of plastic, comprising the steps of:
   producing an electrical corona discharge in a corona-discharge zone between at least one voltage-conducting electrode and a grounded counter-electrode;
   placing a plastic article in the corona-discharge zone onto the surface of said grounded counter-electrode;
   atomizing a liquid to produce an aerosol; and
   introducing the aerosol into the corona-discharge zone by means of a stream of gas.

2. A process as claimed in claim 1, further comprising the step of surface-activating the plastic article in a preliminary step by a corona discharge.

3. A process as claimed in claim 1, comprising the steps of subjecting the plastic article to at least two corona discharges in sequence, each of the corona discharges being carried out in a different aerosol atmosphere.

4. A process at claimed in claim 1, wherein the gas comprises a carrier gas comprising air, a noble gas or mixtures thereof.

5. A process as claimed in claim 1, wherein said aerosols comprise monomers, dispersions or solutions of low- and/or high-molecular-weight polymer compounds and/or colloidal systems in aqueous form or dissolved in solvents.

6. A process as claimed in claim 1, comprising the steps of treating the surfaces of two plastic articles, independently of one another, by said steps in two different aerosol atmospheres, and thereafter bringing the treated surfaces into contact with one another.

7. A process as claimed in claim 1, wherein the plastic article comprises an extruded plastic melt film which is applied in air-free form to a base, wherein said corona discharge is produced by means of an alternating current, and wherein said aerosol is produced by ultrasound atomization of a liquid.

8. A process as claimed in claim 1, further comprising the step of warming the plastic article, the liquid to be atomized to form the aerosol and the gas used for aerosol transport to a temperature between about 20° and 95° C.

9. A process as claimed in claim 8, wherein the plastic article comprises a film sheet having an outside surface to which the aerosol is applied.

10. A process as claimed in claim 9, wherein the surface resistance of the outside surface of the film sheet to which the aerosol has been applied is between $10^8$ and $10^9$ ohm·m.

11. A process as claimed in claim 1, wherein the plastic article comprises a hollow container having an inside surface to which the aerosol is applied.

* * * * *